United States Patent [19]

Tengqvist

[11] Patent Number: 4,948,448

[45] Date of Patent: Aug. 14, 1990

[54] METHOD OF MANUFACTURING MOISTURE RESISTANT CORRUGATED FIBERBOARD

[75] Inventor: Lennart Tengqvist, Stockholm, Sweden

[73] Assignee: Lacani AB, Fagersta, Sweden

[21] Appl. No.: 275,976

[22] Filed: Nov. 25, 1988

[30] Foreign Application Priority Data

Nov. 27, 1987 [SE] Sweden .............................. 8704754

[51] Int. Cl.[5] .......................... B31F 1/20; B32B 31/12

[52] U.S. Cl. .................................. 156/292; 156/205; 156/336

[58] Field of Search ........................ 156/205, 292, 336

[56] References Cited

U.S. PATENT DOCUMENTS 4,086,116 4/1978 Yazaki et al. ........................ 156/205
4,714,727 12/1987 Hume, III ........................... 524/271
4,812,496 3/1989 Leadbetter et al. ............ 156/336 X

*Primary Examiner*—Robert A. Dawson

*Assistant Examiner*—James J. Engel, Jr.

*Attorney, Agent, or Firm*—Nies, Kurz, Bergert & Tamburro

[57] ABSTRACT

A method of manufacturing moisture-resistant corrugated paper board, particularly paper board intended for the manufacture of boxes, comprising an outer planar liner, an inner planar liner and a corrugated so-called floating disposed between the liners, wherein the liners and the floating consist of a paper which incorporates a rosin size. The invention is characterized in that the paper (5) on which the floating (7) is to be formed, is impregnated throughout its thickness with a first substance which includes a plastics suspension, preferably a styrene-butadiene suspension, and starch, and in that the paper (1, 3) for the liners, at least with respect to the surface (2, 4) of at least one of the liners (10) which is intended to face away from the floating (7) is coated with a second suspension which includes a plastics suspension preferably a styrene-butadiene suspension, and starch, and in that respective liners (10) are adhesively bonded to the floating (7).

18 Claims, 1 Drawing Sheet

METHOD OF MANUFACTURING MOISTURE RESISTANT CORRUGATED FIBERBOARD

Figure 1:
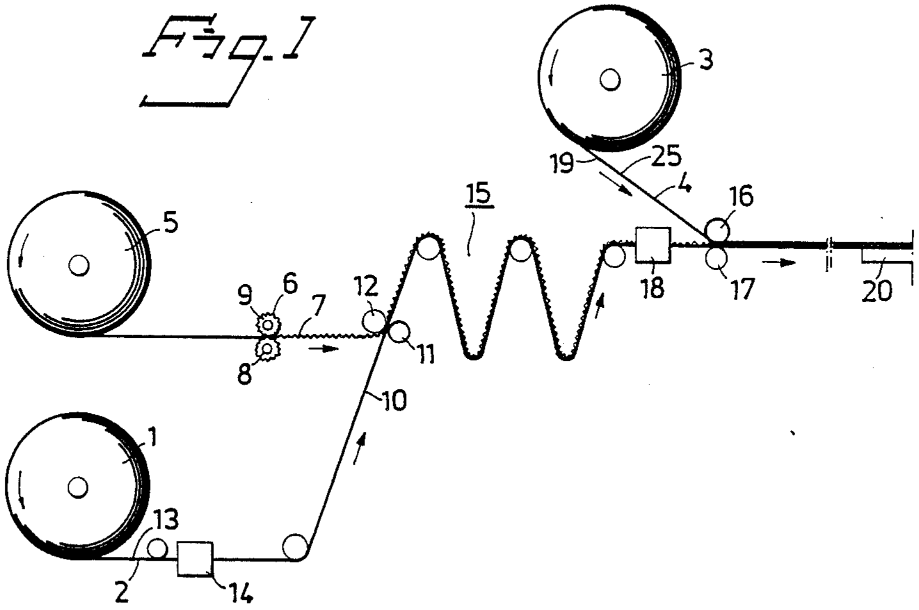

The present invention relates to a method of manufacturing moisture resistant fibreboard, and particularly to corrugated fibreboard intended for the manufacture of boxes.

Corrugated fibreboard comprises planar liners and a corrugated floating located between the liners.

The conventional technique for treating Kraft paper intended for both liners and floating is to size the paper during its manufacture. Sizing provides a more rigid or stiffer paper.

Sizing is normally effected with a rosin size containing, for instance, keten dimers. The keten dimers are effective in improving the wet strength of the material and also form the adhesive necessary for bonding respective liners to the floating. However, the keten dimers do not impart to the paper either sufficient rigidness when dry or a sufficiently high wet strength.

Neither does such sizing of the paper impart a water-repellent surface thereto.

There has long been a desire to increase considerably the wet rigidity of paperboard, so that, for instance, boxes made from corrugated board can be exposed to significant quantities of moisture without losing their strength and rigidity as a result thereof.

In order to render paper proof against moisture and water, paperboard is coated with wax, in order to keep the board dry and rigid.

The wax, however, tends to soften the cellulose fibres, and consequently a box which is made of wax-treated paper will lose some of its stiffness, even though the paper itself remains relatively dry.

One conceivable method of producing corrugated paperboard which can be exposed to large quantities of moisture and water without losing its strength and rigidity is to treat the paper with a plastic substance, so as to seal the paper.

This conceiveable method is rendered impracticable, however, by the fact that the rolls of the corrugating mills in which the paper is corrugated are heated to such high temperatures that the plastic coating would transfer to the rolls during the corrugating process.

This problem is resolved by the present invention. The invention enables paperboard to be produced in which the floating and at least the outer faces of respective liners are treated with a plastic substance.

The present invention thus relates to a method of producing moisture-resistant corrugated paperboard, and particularly, but not exclusively, corrugated paperboard for the manufacture of boxes, which comprises an outer planar liner, an inner planar liner, and so-called corrugated floating located between said liners, and in which both the liners and floating consist of paper which incorporates a rosin size. The invention is characterized by impregnating the paper intended to form such floating with a first suspension which includes a plastic suspension, preferably a styrene-butadene suspension and starch; coating the paper intended to form said liners, at least with respect to the surface of at least one said liner which will face away from said floating, with a second suspension which includes a plastic suspension, preferably a styrenebutadiene suspension and starch, and adhesive bonding the respective liners to said floating.

Figure 2:
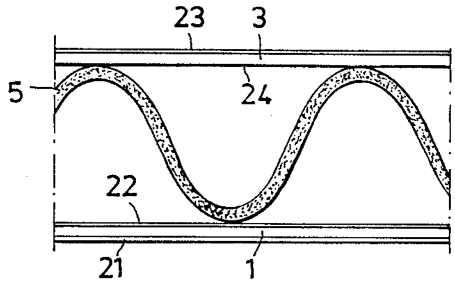

The invention will now be described in more detail, partly with reference to an exemplifying emdodiment illustrated in the accompanying drawing, in which FIG. 1 illustrates schematically a process in the manufacture of corrugated paperboard in accordance with the invention; and FIG. 2 is a sectional view of corrugated paperboard manufactured in accordance with the inventive method.

The inventive method is illustrated partially in FIG. 1. FIG. 1 illustrates a corrugated paperboard manufacturing process which utilizes paper treated in accordance with the present invention.

When manufacturing Kraft paper for use with the inventive method, a rosin size, for instance, keten dimers, is introduced into the paper pulp in a known manner, to an extent such that the Kraft paper will be sized to a so-called Cobb-number beneath 25.

The paperboard comprises an outer planar liner, an inner planar liner and an intermediate, corrugated floating. By outer liner is meant the liner which in the finished box, or other product, is intended to form the outwardly facing surface of the box, i.e. the surface exposed directly to the surroundings.

In accordance with the invention, the floating is impregnated throughout with a first suspension which includes a plastic suspension and starch. Furthermore, at least one of the surfaces of said liners remote from the floating is coated with a second suspension which includes a plastic suspension and starch.

Both of said suspensions will preferably include a plastic suspension which contains styrene-butadiene. However, other water suspended plastics, such as acrylates can be used. The present invention is not limited to the use of a given type of plastic. Styrene-butadiene is preferred, however.

According to one preferred embodiment of the inventive method, the floating is treated and respective liners are coated in a paper machine, not shown, intended for the manufacture of said paper from paper pulp.

The paper machine may be of any suitable known kind.

The treatment and coating processes are conveniently carried out subsequent to the paper having passed the first or second drying section of the paper machine. The paper will then normally have a dry content of 50–60%. The paper has its maximum suction ability at a dry content of approximately 50%. By dry content is meant the weight proportion of dry substance.

According to one preferred embodiment of the invention, the floating is impregnated when the paper has a dry solids content of about 45% to 55%, preferably 50%. The paper is herewith able to absorb the first suspension so that the floating will be impregnated throughout the whole of its thickness.

According to a further preferred embodiment, the liners are coated when the paper has a high dry solids content, namely a dry solids content of about 55% to 65%, preferably 60%. The reason why the liners are coated at a higher dry solids content is because the second suspension will then only partially penetrate into the liner. This is necessary because the non-coated side of the liner is to be adhesively bonded to the floating. The gluing or bonding process is made difficult when also the surface facing the floating is coated with the second suspension. Furthermore, corrugated paperboard in which all the elements thereof are throughimpregnated is much more costly than when solely the floating is impregnated throughout.

However, in its widest concept the invention also includes coating respective liners on both sides thereof with the second suspension, which implies that respective liners may be impregnated more or less throughout their respective thicknesses, depending, inter alia, on the dry solids content of the paper at the time of coating.

According to the invention, the dry substance of the first suspension is a plastic substance, where styrene-butadiene is preferred, as beforementioned, and starch. The ingoing weight of plastic to the ingoing weight of starch is between about 250:1 and 25:1, preferably about 100:1. The dry substance is suspended in water, such that the suspension will have a dry solids content of about 25% to 35%, preferably a dry solids content of about 32%.

According to the invention, the dry substance of the aforesaid second suspension is a plastics substance, where styrene-butadiene is preferred, as beforementioned, and also includes starch and a wax. The wax will preferably be a polyethylene wax, although there can alternatively be used other water-suspended waxes capable of being suspended together with said plastic substance. The ingoing weight of plastic to the ingoing weight of starch is between about 250:1and 25:1, preferably about 100:1. Furthermore, the ingoing weight of plastic to the ingoing weight of wax is between about 25:1 and 5:1, preferably about 10:1. The dry substance is suspended in water to a dry solids content of 40% to 50%, preferably to a dry solids content of 45%.

The dry solids content of the first suspension is lower than the dry solids content of the second suspension, because it is desired to impregnate the floating throughout its thickness, whereas coating of respective liners in accordance with the preferred embodiment, shall take place in a manner such that the second suspension will only partially penetrate into said liners.

A further difference between the two suspensions is that the second suspension contains a wax, preferably polyethylene wax. This is because a water-globulizing or water-repellant surface is desired.

According to one preferred embodiment of the invention, the floating is impregnated with the first suspension to a surface weight, or grammage of about 15–20 g/m$^2$, preferably 18 g/m$^2$.

According to a further preferred embodiment, respective liners are coated with the second suspension to a surface weight, or grammage, of about 10–g/m$^2$, preferably 12 g/m$^2$.

Floating and liners which have been treated in accordance with the aforegoing will provide a corrugated board in which the floating is totally water-repellant and both dry rigid and wet rigid. Furthermore, respective liners are both water repellant and, relatively speaking, highly wet rigid, even though the floating will be more wet rigid, due to being impregnated throughout its thickness. The floating and respective liners have a very high dry rigidity, inter alia due to the fact that the paper has been hard sized, i.e. to a Cobb-number beneath 25.

The terms floating and liners have been used in the aforegoing to describe the inventive method. It will be understood, however, that these terms refer to the paper which will form the floating and respective liners in a final corrugated board.

Paper thus treated is dried and introduced into a corrugated paperboard mill, schematically illustrated in FIG. 1. The reference 1 designates paper intended for the outer liner, which is coated on the surface thereof referenced 2. The reference 3 designates the paper intended for the inner liner, which is coated on the surface thereof referenced 4.

The reference 5 indicates the paper which is intended to form the floating. The arrows in FIG. 1 show the directions in which the various papers are transported.

The paper 5 is passed to a corrugated board mill 6, in which the paper is corrugated to form a floating paper 7. The corrugating process is carried out conventionally at high temperatures, where the rolls 8, 9 of the mill are heated. The floating paper 7 will thus be very warm when it meets the outer liner 10, this meeting taking place between two rolls 11, 12. The rollers 11, 12 may also be heated.

As mentioned in the introduction, it has not previously been possible to use plastic-coated paper in the manufacture of corrugated paperboard, since the plastic will fasten to at least the rolls 8, 9 in the corrugated board mill, owing to the fact that at least these rolls are heated. This problem is solved according to the invention by the inclusion of starch in the first and the second suspension. The present invention is based on the realization that the use of starch will passivate the free ends of the molcular chains of the plastic substance, the styrene-butadiene, as a result of attachment of starch molecules to the free ends of said chains. Thus, the plastic substance in the suspension absorbed by and dried in the floating paper and the suspension applied to and dried on respective liners will not be deposited on hot rolls, despite their high temperatures.

The starch also provides another effect, namely one of increasing the dry rigidity of the Kraft paper. The increase in wet rigidity, on the other hand, is provided mainly by the plastic substance.

Since the floating is thoroughly impregnated and saturated with the first suspension, it is necessary to use a surface adhesive for the purpose of bonding the outer liner to the floating.

Consequently, in accordance with a preferred embodiment, the surface 13 of the outer liner 1 facing the floating is coated with a suitable hot melt surface adhesive. This is effected in a conventional coating station referenced 14. When the outer liner 9 comes into contact with the floating, the hot melt adhesive will melt, thereby bonding the floating to the outer liner.

The floating 7 and the liner 10 are then cooled in a cooling and equalizing path, generally referenced 15, whereafter said floating and liner are brought into contact with the inner liner 3, in the nip of a roll pair 16, 17.

According to one preferred embodiment, the surface of the floating facing away from the outer liner 10, at least with respect to the outwardly projecting part of the floating, is coated upstream of the roll pair 16, 17 with a cold adhesive. The cold adhesive is applied by means of a conventional applicator station 18.

The cold adhesive must suitably be a surface adhesive, since the floating is not capable of absorbing adhesive. The reason for using a cold adhesive is to obviate the necessity of subjecting the floating and the inner liner 25 to heat at this stage, as will be necessary if a hot melt adhesive were used.

However, the surface 19 of the inner liner 25 facing the floating may be coated with a hot melt adhesive upstream of the roll pair 16, 17, said roller 16 being held at a sufficiently high temperature to melt the adhesive.

Subsequent to exiting from the roll pair 16, 17, the finished corrugated board is laid on a conventional drying table 20.

It will be evident from the aforegoing that the floating and the outer liner, and also optionally the inner liner, come into contact with heated rolls 8, 9, 11, 12 and optionally 16.

FIG. 2 illustrates the finished corrugated paperboard produced in accordance with the aforedescribed preferred embodiment. The outer surface of the outer liner 1 has a zone 21 which has been treated with said second suspension. A hot melt adhesive 22 has been applied to its inner surface.

The inner liner 3 has on its outer surface a zone 23 which has been treated with said second suspension. The inner surface 24 is untreated.

The floating 5 is totally impregnated with said first suspension.

The present invention thus provides corrugated paperboard from which highly moisture-resistant products, inter alia in the form of boxes, can be produced, and which can be exposed to moisture and water over long periods of time while retaining their strength and rigidity. It will be understood that the aforedescribed methods of manufacture can be modified within the scope of the invention. Furthermore, the suspensions may contain further ingredients.

The invention shall not therefore be considered restricted to the aforedescribed embodiments, since modifications can be made thereto within the scope of the following claims.

I claim:

1. A method of manufacturing a moisture-resistant corrugated paperboard, particularly board intended for the manufacture of boxes, comprising an outer, planar liner, an inner planar liner and a corrugated floating disposed between said liners, and in which board the liners and floating consist of paper which includes a rosin size, the method comprising the steps of: totally impregnating, throughout the whole of its thickness, paper (5) which will be made into said corrugated floating (7), with a first suspension which includes a plastic suspension and starch; drying said impregnated paper; then corrugating, between heated rolls, said dried impregnated paper intended for the floating; coating and at least partially impregnating additional paper (1, 3), which will provide said liners, at least with respect to the surface (2, 4) of at least one of said liners (10, 25) which is intended to face away from the floating (7), with a second suspension which includes a plastic suspension and starch; and adhesively bonding respective liners (10; 25) to the corrugated floating (7).

2. The method defined in claim 1 wherein said plastic suspension in both said first and said second suspensions is a styrene-butadiene suspension.

3. A method according to claim 1, wherein the first suspension includes water and dry substance, which dry substance comprises a plastics substance and starch, where the ratio of the weight of plastics substance to the weight of starch before water is added to make the suspension is between about 250:1 and 25:1 and wherein said dry substance suspended in water forms a suspension having a dry substance solids content of about 25% to 35%.

4. A method according to claim 3, wherein said plastic substance is styrene-butadiene; the ratio of the weight of the plastic substance to the weight of starch is about 100:1 ; and said dry substance which is suspended in water forms a suspension having a dry substance solids content of about 32%.

5. A method according to claim 1, wherein said second suspension includes water and dry substance, which dry substance comprises a plastic substance, starch and a wax, wherein the ratio of weight of plastic substance to the weight of starch before water is added to make the suspension is between about 250:1 and 25:1 ; wherein the ratio of weight of plastic substance to the weight of wax before water is added to make the suspension is between about 25:1 and 5:1 ; and wherein said dry substance is suspended in water to a dry substance solids content of 40% to 50%.

6. A method according to claim 5, wherein said plastic substance is styrene-butadiene; and said wax is a polyethylene wax.

7. A method according to claim 6, wherein the ratio of the weight of plastic substance to the weight of starch is 100:1.

8. A method according to claim 7, wherein the ratio of the weight of plastic substance to the weight of wax is about 10:1.

9. A method according to claim 8, wherein said dry substance suspended in water forms a suspension having a dry substance solids content of 45%.

10. A method according to claim 1, characterized in that the step of impregnating said paper throughout its thickness is carried out in an existing paper machine, and wherein the paper has a dry solids content of about 45% to 55%.

11. A method according to claim 1, wherein the step of impregnating said paper throughout the whole of its thickness is carried out in an existing paper machine, in which the paper has a dry solids content of 50%.

12. A method according to claim 1, wherein impregnation of the paper which forms the floating is effected to a surface weight of the first suspension of about 15–20 $g/m^2$.

13. A method according to claim 12, wherein said impregnation of the paper which forms the floating is effected to a surface weight of the first suspension of 18 $g/m^2$.

14. A method according to claim 1, wherein coating of said paper which forms said liner is carried out in an existing paper making machine, wherein the paper has a dry solids content of about 55% to 65%.

15. A method according to claim 1, wherein coating of said paper which forms said liner is effected to a surface weight of the second suspension of about 10–14 $g/m^2$.

16. A method according to claim 15, wherein coating of said paper which forms said liner is effected to a surface weight of the second suspension of 12 $g/m^2$.

17. A method according to claim 1, wherein the surface (13) of the outer liner (10) facing the corrugated floating (7) is coated with a hot melt adhesive, whereafter the liner (10) is brought together with the corrugated floating (7) and adhesively bonded thereto.

18. A method according to claim 1, wherein the surface of the corrugated floating (7) facing away from the outer liner (10), at least with respect to the outwardly projecting parts of the corrugated floating (7), is coated with a cold adhesive, whereafter the corrugated floating is brought together with the inner liner (25) and adhesively bonded thereto.

* * * * *

UNITED STATES PATENT AND TRADEMARK OFFICE

CERTIFICATE OF CORRECTION

PATENT NO. : 4,948,448

DATED : August 14, 1990

INVENTOR(S) : LENNART TENGQVIST

It is certified that error appears in the above-identified patent and that said Letters Patent is hereby corrected as shown below:

COLUMN 6, Line 21;

In claim 7, line 3, before "100:1" please insert --about--.

Signed and Sealed this

Tenth Day of March, 1992

Attest:

HARRY F. MANBECK, JR.

*Attesting Officer*

*Commissioner of Patents and Trademarks*